(12) United States Patent
Fuse et al.

(10) Patent No.: US 6,431,551 B1
(45) Date of Patent: Aug. 13, 2002

(54) NON-CONTACT TYPE MECHANICAL SEAL

(75) Inventors: Toshihiko Fuse; Eiji Okumachi, both of Sanda (JP)

(73) Assignee: Nippon Pillar Packing Co., Ltd., Osaka (JP)

( * ) Notice: Subject to any disclaimer, the term of this patent is extended or adjusted under 35 U.S.C. 154(b) by 7 days.

(21) Appl. No.: 09/638,897

(22) Filed: Aug. 15, 2000

(30) Foreign Application Priority Data

Aug. 16, 1999 (JP) .......................................... 11-229601

(51) Int. Cl.[7] .............................. F16J 15/38; F16J 15/34
(52) U.S. Cl. ..................... 277/390; 277/399; 277/401
(58) Field of Search ............................... 277/358, 367, 277/370, 372, 397, 400, 401, 408, 390

(56) References Cited

U.S. PATENT DOCUMENTS

| | | | |
|---|---|---|---|
| 2,531,079 A | * | 11/1950 | Payne |
| 3,589,738 A | * | 6/1971 | Herbert |
| 3,727,924 A | * | 4/1973 | Henderson |
| 3,917,289 A | * | 11/1975 | Ivanov et al. |
| 4,523,764 A | * | 6/1985 | Albers et al. |
| 5,354,070 A | * | 10/1994 | Carmody |
| 5,722,665 A | | 3/1998 | Sedy et al. |
| 6,059,293 A | * | 5/2000 | Azibert et al. ............... 277/358 |
| 6,135,458 A | * | 10/2000 | Fuse .......................... 277/401 |
| 6,155,572 A | * | 12/2000 | Wu et al. |

FOREIGN PATENT DOCUMENTS

| | | |
|---|---|---|
| EP | 0 601 821 | 6/1994 |
| JP | 09-004720 | 1/1997 |
| JP | 09-196184 | 7/1997 |

* cited by examiner

Primary Examiner—Anthony Knight
Assistant Examiner—Vishal Patel
(74) Attorney, Agent, or Firm—Griffin & Szipl, P.C.

(57) ABSTRACT

A non-contact-type mechanical seal that keeps a rotary seal ring 6 from vibrating in what is called a pneumatic hammer fashion. For this purpose, an annular space 23 is formed between an outer circumferential surface 21a of the rotary seal ring 6 and an inner circumferential surface 13a of a holder portion 13 of a spring retainer 5. The annular space 23 is sealed by a pair of O rings 22, 22. In addition, seal gas leading passages 24 are provided in the rotary seal ring 6 through which spaces between seal end faces 3a, 6a communicate with the annular space 23. Seal gas 8 is supplied to static pressure generating grooves 15, and led into the annular space 23 through seal gas leading passages 24. The seal gas presses O rings 22, 22 against the outer circumferential surfaces of the rotary seal ring 6 and the inner circumferential surface of the holder portion 13 of the spring retainer 5, thereby firmly holding the rotary seal ring 6.

11 Claims, 3 Drawing Sheets

NON-CONTACT TYPE MECHANICAL SEAL

FIELD OF THE INVENTION

The present invention relates to a static pressure non-contact type mechanical seal suitable for use in such rotary machines as turbines, blowers, compressors, agitators and rotary valves handling a variety of gases, including poisonous gases, inflammable gases, explosive gases and powder-mixed gases.

BACKGROUND OF THE INVENTION

A known non-contacting mechanical seal of the non-contact type comprises a stationary seal ring fixed on a seal case, a spring retainer provided on a rotary shaft, a rotary seal ring mounted on the rotary shaft to be movable in the axial direction and held between the stationary seal ring and the spring retainer with O rings provided as a secondary seal for sealing a space between the rotary shaft and the rotary seal ring, seal gas supply passages that pass through the stationary seal ring and supply a gas—under a higher pressure than the fluid to be sealed—between the seal end faces facing each other of the two seal rings, and spring members, placed between the rotary seal ring and the spring retainer, pressing the rotary seal ring against the stationary seal ring, wherein the two seal rings are relatively rotated with the opposed seal end faces held in a non-contacting state by the seal gas supplied therebetween, thereby producing a seal between the inner and outer circumferential regions of the relatively rotating parts, that is, the sealed fluid region and the outside region (usually, the atmospheric region).

In the non-contact-type mechanical seal of such a construction, a static pressure fluid film of the seal gas is formed between the two seal end faces, and the presence of this fluid film holds the two seal rings in a non-contacting state, that is, keeps the two seal rings only slightly spaced from each other. The seal gas supplied between the two seal end faces is under a higher pressure than the fluid to be sealed. Therefore, the seal gas leaks out to the sealed fluid region and the outside region, but the sealed fluid cannot get between the two seal end faces. Thus, the sealed fluid is perfectly prevented from leaking out to the outside region. And the shaft can be sealed well in the rotary machine handling such fluids as poisonous gases, inflammable gases and explosive gases that must not leak out.

In such static pressure non-contact-type mechanical seals, self-excited vibration called pneumatic hammer vibration is inevitably caused at the seal gas flowing passages up to between the two seal end faces, because the seal gas supplied from the seal gas supply passages to the seal end faces is a compressed gas. While the stationary seal ring clamped on the seal case is not affected by that, the rotary seal ring that is held on the rotary shaft merely via the O rings vibrates with a minute amplitude as small as or smaller than the gap between the seal end faces. The vibration of the rotary seal ring has no adverse effect in particular on the seal function of the non-contact-type mechanical seal, but it is desirable that the vibration should be prevented so as not to cause a vibration sound.

SUMMARY OF THE INVENTION

It is an object of the present invention to provide a static pressure non-contact mechanical seal that can prevent the rotary seal ring from vibrating to the maximum possible extent.

The non-contact mechanical seal according to the present invention comprises a stationary seal ring (3) clamped on a seal case (2), a spring retainer (5) provided on a rotary shaft (4), a rotary seal ring (6) fit over the rotary shaft, movable in the axial direction and held between the stationary seal ring (3) and the spring retainer (5) with a secondary seal provided between the rotary shaft (4) and the rotary seal ring (6), a seal gas supply mechanism (9) that supplies the seal gas—under a higher pressure than the sealed fluid—to between opposed seal end faces (3a, 6a) of the two seal rings (3, 6) through one or more seal gas supply passages (15, 16, 18) that pass through the stationary seal ring (3), and spring members (7), placed between the rotary seal ring (6) and the spring retainer (5), pressing the rotary seal ring (6) against stationary seal ring (3). The two seal end faces (3a, 6a) are rotated relative to one another and held in a non-contacting state by seal gas (8) supplied therebetween, thereby producing a seal between the inner and outer circumferential regions of the relatively rotating parts, that is, a sealed fluid region (G) and an outside region (A). To achieve the aforesaid object, a cylindrical holder portion (13) surrounding the outer circumferential portion of the rotary seal ring (6) is formed on the spring retainer (5), and a pair of O rings (22) are placed and engaged in annular O ring grooves (21) slightly spaced from each other in the axial direction which are formed on an outer a circumferential portion of the rotary seal ring (6). In this manner, an annular space (23) is formed between the rotary seal ring (6) and a holder portion (13) of the spring retainer (5). And one or more seal gas leading passages (24) through which spaces between the seal end faces (3a, 6a) communicate with the aforesaid annular space (23) are formed in the rotary seal ring (6).

In a preferred embodiment, the seal gas is properly selected according to the sealing conditions. That is, the seal gas to be used should be one that is harmless even if the gas leaks out to the sealed fluid region (G) and the outside region (A) and has no adverse effect on the gas in the machine, that is, the sealed fluid. Generally, clean nitrogen gas is used as seal gas (8) that is inert to a variety of substances and harmless to humans. The O rings (22) used to seal the annular space (23) are preferably made of a non-compressive elastic material like natural rubber and synthetic rubber.

The seal gas leading passages (24) pass through the rotary seal ring (6), each passage having one open end (24a) opening on the seal end face (6a) and another open end (24b) opening into the annular space (23). The one open end (24a) of each seal gas leading passage (24) is preferably positioned exactly opposite to the static pressure generating groove (15). It is further desirable that the diameter (D) of the one open end (24a) be set to be equal to or slightly smaller than the groove width (W). To be exact, the diameter (D) means the width of the one open end (24a) in the radial direction of the rotary seal ring (6), for the one open end (24a) is not always circular in form.

The seal gas supply passages comprise static pressure generating grooves (15) formed on the seal end face (3a) of the stationary seal ring (3), a communicating space (16) formed between the stationary seal ring (3) and the seal case (2), a passage (17) on the seal case side that passes through the seal case (2) to the communicating space (16), and a passage (18) on the seal ring side that passes through the stationary seal ring (3) and extends from the communicating space (16) to the static pressure generating grooves (15). A squeezer (19) is provided in this seal gas supply passage (18). The squeezer (19) is an orifice, capillary tube or a porous material.

In a preferred embodiment, the static pressure generating grooves (15) are formed of a plurality of arc-shaped recessed grooves (15a) arranged in an annular form concentrically with the stationary seal end face (3a). The respective arc-shaped recessed grooves (15a) are identical in groove width and depth. The length (L) in the circumferential direction of the stationary seal end face portion (15b) between the arc-shaped recessed grooves (15a) is set to be equal to or about equal to the groove width (W) of the static pressure generating grooves (15) or the groove width (W) of the arc-shaped recessed groove (15a).

For reasons described below, it is desirable that the pressure (Ps) of the seal gas (8) supplied to the seal gas supply passages from a seal gas source is so controlled that the pressure (Pp)—the pressure in the static pressure generating groove—of the seal gas (8) led to static pressure generating grooves (15) through squeezer (19) is 0.5–1.5 bar higher than the pressure (Pg) of the sealed fluid. In other words, it is desirable that the supply pressure (Ps) of the seal gas (8) should be maintained 1 to 3 bar higher the pressure (Pg) of the sealed fluid.

Further objects, features and advantages of the present invention will become apparent from the Detailed Description of The Preferred Embodiments, which follows, when considered together with the attached Drawings, described below.

DESCRIPTION OF THE PREFERRED EMBODIMENTS

Now, the embodiments of the present invention will be described in detail with reference to FIGS. 1 to 4. It is understood that the expressions "front," "before," "forward", and the like, mean to the left in FIG. 1 and the expressions "back," rear," "backward," and the like, mean to the right in FIG. 1.

Figure 1:
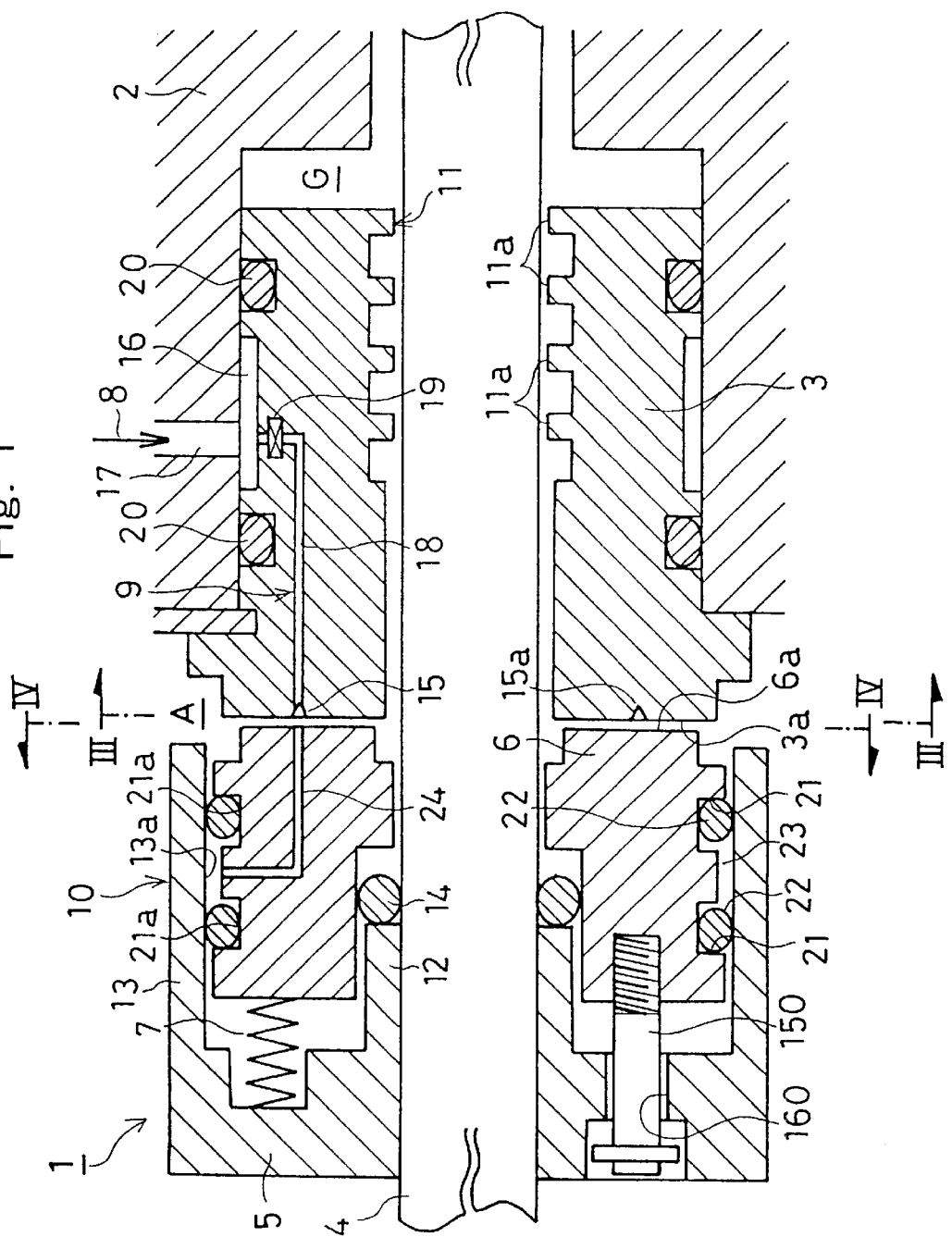
FIG. 1 is a vertical, sectional view showing an example of the non-contact-type mechanical seal of the present invention.

As shown in FIG. 1, the non-contact-type mechanical seal embodying the present invention, comprises: a stationary seal ring 3 clamped on a seal case 2, a spring retainer 5 fit over and fixed on a rotary shaft 4 of a rotary machine, a rotary seal ring 6 fit over and held on the rotary shaft 4 in a state movable in the axial direction (front-to-back direction), spring members 7 that press the rotary seal ring 6 against the stationary seal ring 3, a seal gas supply mechanism 9 to supply seal gas 8 to between seal end faces 3a, 6a, that is, the opposed seal end faces of the two seal rings 3, 6, and a vibration-preventing mechanism 10 for preventing the vibration of the rotary seal ring 6, wherein the seal end faces 3a, 6a, that is, the opposed seal end faces of the two seal rings 3, 6 are relatively rotated in a non-contacting state, thereby producing a seal between the inner circumferential region of the relatively rotating parts, that is, the sealed fluid region G and the outer circumferential region, that is, the outside region A. It is noted that the sealed fluid region G communicates with the inside of the rotary machine, and is filled with an inside gas or sealed fluid, while the outside region A is the atmospheric region outside the rotary machine.

The seal case 2 is cylindrical in shape, with a rear end mounted on a rotary machine housing (not shown) in such a way that the rotary shaft 4 concentrically passes therethrough.

The stationary seal ring 3 is a ring-shaped body, and concentrically and loosely surrounds the rotary shaft 4 and is fit into and fixed in an inner circumferential portion of the seal case 2, as shown in FIG. 1. The seal end face 3a, or front end of the stationary seal ring 3 (hereinafter referred to as stationary seal end face) is an annular smooth surface and is perpendicular to the axis of rotation of shaft 4. A labyrinth seal 11 is provided between the rear end portion of the stationary seal ring 3 and the rotary shaft 4. The labyrinth seal 11 is made up of a plurality of annular protrusions 11a provided side by side on the inner circumferential surface of the stationary seal ring 3. The protrusions 11a extend close to an outer circumferential surface of the rotary shaft 4, as shown in FIG. 1.

The spring retainer 5 is a ring-shaped body provided in front of the stationary seal ring 3 and fit and fixed around the rotary shaft 4, as shown in FIG. 1. In the inner and outer circumferential portions of the spring retainer 5, there are concentrically provided an annular O ring stopper 12 and a cylindrical holder portion 13 that extends backward.

The rotary seal ring 6 is a ring-formed body with the rear end face 6a (hereafter referred to as rotary seal end face) formed into an annular smooth surface perpendicular to the axial line as shown in FIG. 1. Provided between the stationary seal ring 3 and the spring retainer 5, the rotary seal ring 6 is fit over and held on the rotary shaft 4 in a state movable in the axial direction with O ring 14 placed between the inner circumferential surface of the rotary seal ring 6 and the outer circumferential surface of the rotary shaft 4. The rotary seal ring 6, while being allowed to move for a specific range in the axial direction, is kept from relatively rotating with respect to the shaft 8 and the retainer 5 by inserting and engaging a rotation stopper pin 150 in a engaging hole 160 in the retainer 5. The rotation stopper pin 150 is screwed into the front end of the rotary seal ring 6.

The spring members 7 include a plurality of springs (only one spring shown) placed between the spring retainer 5 and the rotary seal ring 6 as shown in FIG. 1 and thrust the rotary seal ring 6 toward the stationary seal ring 3, generating a closing force that works to close the gap between the seal end faces 3a, 6a.

Figure 2:
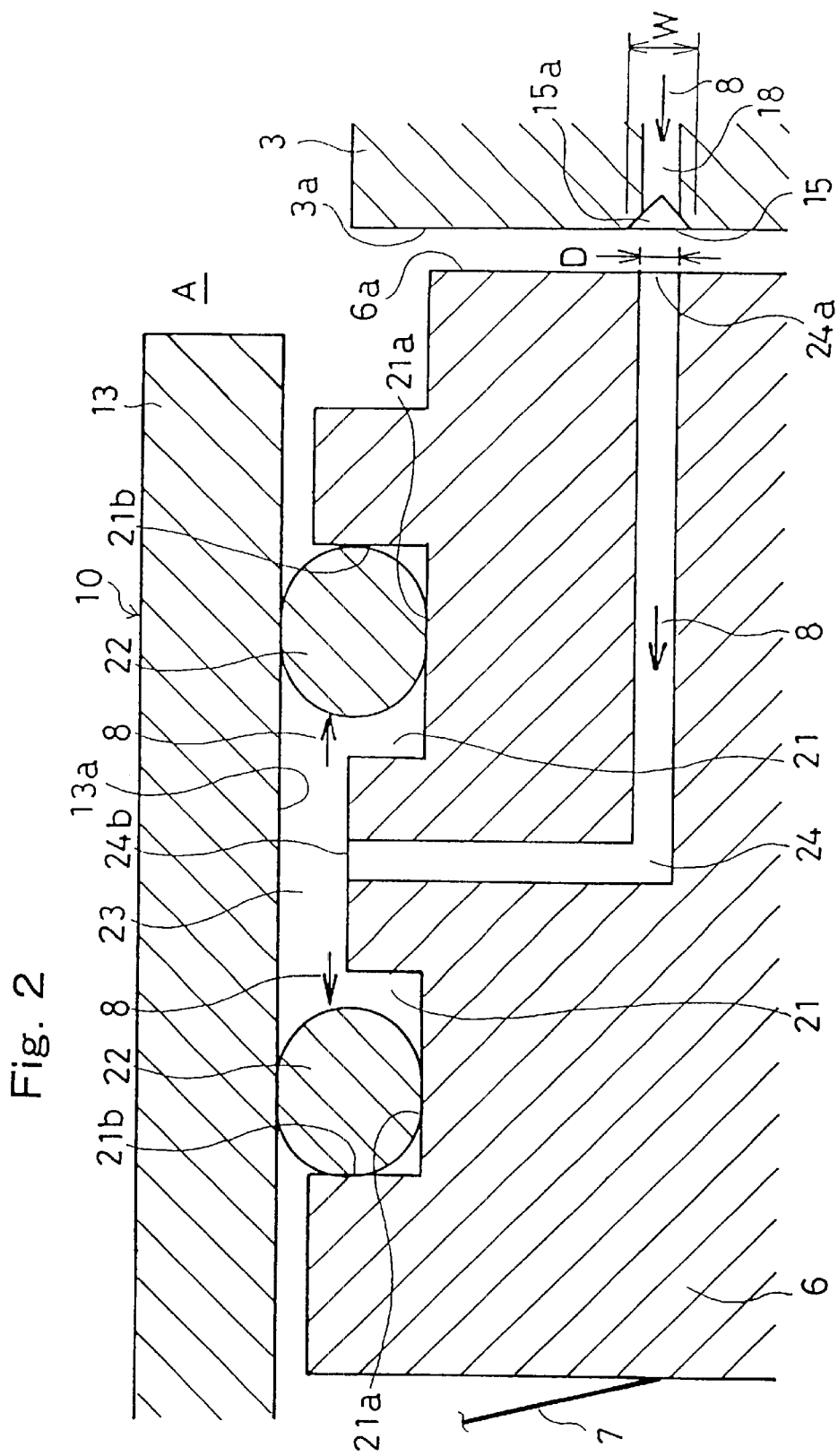
FIG. 2 is an enlarged view of an essential part of the view in FIG. 1.
Figure 3:
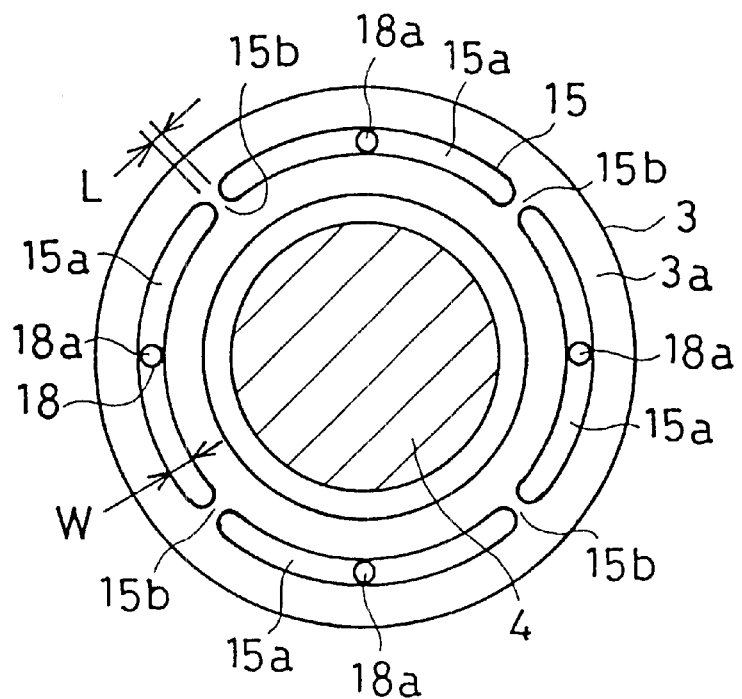
FIG. 3 is a vertical, sectional front view taken along line III—III in FIG. 1.

The seal gas supply mechanism 9 is made up of a series of seal gas supply passages 15, 16, 17, 18 formed in the seal case 2 and the stationary seal ring 3 and a squeezer 19 as shown in FIGS. 1 to 3. The seal gas 8, under a higher pressure than the pressure Pg of the sealed fluid, is supplied to between the seal end faces 3a, 6a to produce a static pressure (opening force) that works to open the seal end faces 3a, 6a.

The seal gas supply passages include the static pressure generating grooves 15 formed on the stationary seal end face 3a, the annular communicating space 16 formed between the outer circumferential surface of the stationary seal ring 3 and the inner circumferential surface of the seal case 2, and the seal gas supply passage 18 on the seal ring side extending from the communicating space 16 to the static pressure generating grooves 15 through the stationary seal ring 3.

The static pressure generating grooves 15 are a number of shallow recessed grooves or a shallow recessed continuous groove formed concentrically with the stationary seal end face 3a in an annular form. In this example, separate grooves are formed. That is, the static pressure generating grooves 15 are a plurality of arc-shaped recessed grooves 15a formed and disposed end to end in an annular form concentrically with the stationary seal end face 3a as shown in FIG. 3. All the arc-shaped recessed grooves 15a are identical in groove width W and groove depth. More particularly, four arc-shaped recessed grooves 15a, all identical in shape, are formed on the stationary seal end face 3a at the same interval L. The length L in the circumferential direction between the adjacent arc-shaped recessed grooves 15a on the stationary seal end face portion 15b (hereinafter referred to as "inter-groove land portion") is set to be equal to or about equal to the groove width W of the static pressure generating grooves 15. The communicating space 16 is sealed with O rings 20 placed between the opposed circumferential surfaces of the seal case 2 and the stationary seal ring 3. The downstream end of the seal gas supply passage 18 branches out to the respective openings 18a of the arc-shaped recessed grooves 15a forming the static pressure generating grooves 15. The upstream end of the seal gas supply passage 17 is connected to a seal gas source (not shown) from which the seal gas 8 is supplied to the static pressure generating grooves 15 through the passage 17 on the seal case side, the communicating space 16 and the passage 18 on the seal ring side. The seal gas 8 is selected properly according to sealing conditions. That is, the gas selected should be harmless even if the gas leaks out to the regions G, A and has no adverse effect on the gas in the machine, that is, the sealed fluid. In this example, clean nitrogen gas is used that is inert to a variety of substances and harmless to humans. It is noted that the seal gas 8 is supplied only when the rotary machine is in operation (while the rotary shaft 4 is rotating), and the supply of the seal gas 8 is suspended when the machine is put out of operation. The rotary machine is started only after the seal gas 8 is supplied and the seal end faces 3a, 6a are held properly in a non-contact state. And the supply of the seal gas 8 is cut off only after the rotary machine is put out of operation with the rotary shaft coming to a complete stop.

The squeezer 19 suitable for the purpose of the present invention includes orifices, capillary tubes and porous materials that have a squeezing function. The squeezer 19 is provided at a suitable point in the seal gas supply passage 18—on the upstream side of the passage branching portion where the passage is branched out to communicate with the arc-shaped recessed grooves 15a.

If the seal gas 8 is supplied to the static pressure generating grooves 15, the seal gas 8 led into the static pressure generating grooves 15 produces an opening force to open the seal end faces 3a, 6a. This opening force is produced by a static pressure generated by the seal gas 8 fed between the seal end faces 3a, 6a. Therefore, the seal end faces 3a, 6a are held in a non-contact state as an equilibrium is established between the opening force and the closing force (spring load) by the spring members 7 that work to close the gap between the seal end faces 3a, 6a. In other words, the seal gas 8 led into the static pressure generating grooves 15 forms a static pressure fluid film between the seal end faces 3a, 6a. The presence of this fluid film produces a seal between the regions inside and outside the seal end face 3a, 6a, that is, the sealed fluid region G and the outside region A. The pressure of the seal gas 8 and the spring force (spring load) of the spring members 7 are properly adjusted so that the gap between the seal end faces 3a, 6a is just right—generally 5 to 15 $\mu$m. In this connection, the seal gas 8 is squeezed by the squeezer 19 before being led into the static pressure generating grooves 15. Therefore, even if the gap between the seal end faces 3a, 6a changes, the gap will be automatically adjusted to a proper size. That is, when the gap between the seal end faces 3a, 6a widens due to vibration of the rotary machine or the like, the equilibrium is lost between the amount of the seal gas flowing in between the seal end faces 3a, 6a from the static pressure generating grooves 15 and the amount of the seal gas supplied to the static pressure generating grooves 15 through squeezer 19. As a result, the pressure within the static pressure generating grooves 15 drops and the opening force is smaller than the closing force with the result that the gap between the seal end faces 3a, 6a decreases, whereby the gap is adjusted to a proper size. If, on the other hand, the gap between the seal end faces 3a, 6a decreases, the pressure in the static pressure generating grooves 15 is increased by the squeezing function of the same squeezer 19 as mentioned above, and the opening force outdoes the closing force. As a result, the gap between the seal end faces 3a, 6a increases to bring the gap to a proper level.

For reasons described below, it is desirable that the pressure Ps (hereinafter referred to as "seal gas pressure") of the seal gas 8 supplied to the passage 17 on the seal case side from the seal gas supply source is controlled so that the pressure Pp in the respective arc-shaped recessed grooves 15a (hereinafter referred to as "pocket pressure") of the seal gas 8 led in the static pressure generating grooves 15 from the seal gas supply passage 18 through the squeezer 19 is 0.5 to 1.5 bar higher than the sealed fluid pressure Pg. To put it another way, Pg+0.5 bar$\leq$Pp$\leq$Pg+1.5 bar. The length L in the circumferential direction of the inter-groove land portion 15a between adjacent grooves on the stationary seal end face 3a is set to be equal to or about equal to the groove width W (groove width of the arc-shaped recessed grooves 15a) of the static pressure generating grooves 15 as mentioned above. If Pp<Pg+0.5 bar, the pressure distribution of the fluid film formed by the seal gas 8 between the seal end faces 3a, 6a changes greatly in the area corresponding to the inter-groove land portion 15b. Then the fluid film pressure in the area corresponding to the inter-groove land portion 15b drops below the sealed fluid pressure Pg, and it is feared that the inside gas or sealed fluid can leak between the land portion 15b and the seal end face 6a out to the outside region A (atmospheric region). If, on the other hand, Pp>Pg+1.5 bar, then the leakage of the seal gas into the sealed fluid region G from the seal end faces 3a, 6a will increase more than necessary. In this example, therefore, the seal gas pressure Ps is set 1 to 3 bar higher than the sealed fluid pressure Pg (Pg+1 bar<Ps<Pg+3 bar) so that the pocket pressure Pp is maintained at Pg+0.5 bar$\leq$Pp$\leq$Pg+1.5 bar. When the sealed fluid pressure Pg, or the inside pressure, does not change or changes only slightly while the rotary machine is in operation (with the rotary shaft 4 rotating), this seal gas pressure Ps is kept constant within a range where the following conditions are met: Pg+0.5 bar$\leq$Pp$\leq$Pg+1.5 bar, Pg+1 bar$\leq$Ps$\leq$Pg+3 bar. If the sealed fluid pressure Pg can change greatly while the rotary machine is in operation, it can happen that the above conditions can not be satisfied if the seal gas pressure Ps is kept constant. To cope with this, it is desirable to adjust and control the seal gas pressure Ps to satisfy the above conditions according to changes in the sealed fluid pressure Pg. That adjustment and control can be effected without difficulty by a known control system using a differential pressure regulating valve, for example. Needless to say, even if the change in the sealed fluid pressure Pg is small, the adjustment and control of the seal gas pressure Ps may be effected according to fluctuations in the sealed fluid pressure Pg. It is understood that the aforesaid pressures Pg, Pp, Ps are gage pressures (bar) in relation to the atmosphere.

The vibration-preventing mechanism 10 comprises, as shown in FIG. 1 and FIG. 2, the holder portion 13 of the spring retainer 5 that surrounds the outer circumferential portion of the rotary seal ring 6, a pair of O ring grooves 21 formed on the outer circumferential portion of the rotary seal ring 6, a pair of O rings 22, 22 engaged in the O ring grooves 21, 21 and slightly spaced from each other in the axial direction, an annular space 23 formed between the opposed circumferential surfaces of the rotary seal ring 6 and the holder portion 13 of the spring retainer 5 and sealed by the O rings 22, 22.

The O rings 22, 22 are formed of a non-compressive elastic material like synthetic rubber or natural rubber. The O rings 22, 22 are properly pressed between the O ring groove bottoms 21a of the O ring grooves 21 and the inner circumferential surface 13a of the holder portion 13 (to the extent that the rotary seal ring 6 is not prevented from moving in the axial direction), and the annular space 23 is sealed on the two end portions in the axial direction. In this example, the O rings 22, 22, and other O rings, O ring 14 and O ring 20, are made of Viton. The respective seal gas leading passages 24 pass through the rotary seal ring 6 as shown in FIG. 1 and FIG. 2, each having the one end 24a opening into the seal end face 6a and the other end 24b opening into the annular space 23.

Figure 4:
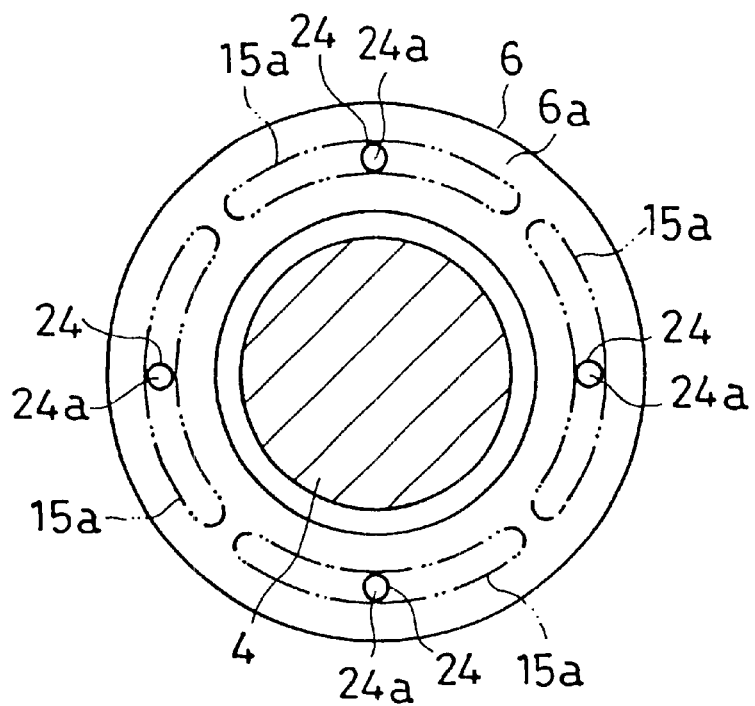
FIG. 4 is a vertical, sectional rear view taken along line IV—IV in FIG. 1.

The one open end 24a of the respective seal gas leading passage 24 is circular and positioned exactly opposite to the static pressure generating grooves 15 as shown in FIG. 2 and FIG. 4. The diameter D (to be exact, the length in the radial direction of the rotary seal ring 6) is set to be the same as or slightly smaller than the groove width W (width W of the arc-shaped recessed groove 15a ) of the static pressure generating grooves 15, that is, D≦W. The other open end 24b of the respective seal gas leading passage 24 is situated between the O ring grooves 21, 21, that is, between the O rings 22, 22. In this example, the same number of seal gas leading passages 24 as the arc-shaped recessed grooves 15a, that is, four passages 24, are provided at the same interval in the circumferential direction of the rotary seal ring 6. In other words, those ends 24a and 24b open on the seal end face 6a and on the outer circumferential surface of the rotary seal ring 6 at positions at the same interval in the circumferential direction of the rotary seal ring 6.

In the non-contact-type mechanical seal 1 provided with the vibration-preventing mechanism 10, the gap between the seal end faces 3a and 6a is kept in a proper non-contact state by the seal gas 8 supplied to the static pressure generating grooves 15 and at the same time the annular space 23 is maintained at the same pressure as that between the stationary seal end faces 3a, 6a by leading the seal gas 8 into the annular space 23 through the seal gas leading passages 24. Therefore, the respective O rings 22 are pressed against the outer inside walls 21b in the annular space 23 by the seal gas 8 and compressed in the axial direction. The respective O rings 22 are made of a non-compressive elastic material, and that increases the pressing force of the respective O rings 22 against the outer circumferential surface (the bottoms 21a of the O ring grooves 21) of the rotary seal ring 6 and the opposite inner circumferential surface 13a of the holder portion 13 of the spring retainer 5. As a result, the rotary seal ring 6 is firmly held on the inner circumferential surface of the holder portion 13 of the spring retainer 5 by O rings 22, 22.

Therefore, no pneumatic hammer-like phenomenon or self-excited vibration will be caused at the rotary seal ring 6. Thus, the rotary seal ring 6 is kept from vibrating and making a vibration sound.

It is to be understood that while specific embodiments of the invention have been shown and described in detail to illustrate the application of the inventive principles, the invention is not limited thereto, but may be otherwise variously embodied within the scope of the basic principle of the present invention. For example, the present invention can be suitably applied to a non-contact-type mechanical seal of such a construction in which the outer circumferential area of the relatively rotating parts of the stationary seal end faces 3a, 6a is the region for sealed fluid while the inner circumferential area is the atmospheric region.

What is claimed is:

1. A non-contact mechanical seal, comprising:

a seal case;

a stationary seal ring fixed on the seal case, and having a first end face and having one or more seal gas supply passages;

a rotary shaft having an axis of rotation defining an axial direction;

a spring retainer provided on the rotary shaft;

a rotary seal ring disposed between the stationary seal ring and the spring retainer, and mounted on and held by the rotary shaft to be movable in the axial direction with a secondary seal provided between the rotary shaft and the rotary seal ring, and having an outer circumferential portion, and a second end face opposed to the first end face of the stationary seal ring;

a cylindrical holder portion defined on the spring retainer and an inner circumferential portion surrounding the outer circumferential portion of the rotary seal ring;

an annular space defined between opposed circumferential portions of the rotary seal ring and the cylindrical holder portion of the spring retainer;

two annular O-ring grooves formed on the outer circumferential surface of the rotary seal ring;

two O rings disposed in the annular O ring grooves spaced from each other in the axial direction and arranged to seal the annular space, wherein the two O rings are identical;

a seal gas supply mechanism arranged to supply seal gas—under a higher pressure than a sealed fluid—to between the opposed first and second end faces of the rotary and stationary seal rings through the one or more seal gas supply passages that pass through the stationary seal ring;

one or more seal gas leading passages provided to communicate seal gas from a space between the first and second seal end faces to communicate with the annular space;

spring members, disposed between the rotary seal ring and the spring retainer, to bias the rotary seal ring toward the stationary seal ring; and an inner sealed fluid region containing sealed fluid, and an outside region defined by the rotary and stationary seal rings; and wherein, when gas is supplied by the gas supply mechanism to the one or more gas supply passages, and the rotary seal ring and stationary seal ring are relatively rotated, the first and second seal end faces are held in a non-contact state with a space therebetween, thereby producing a seal between the inner sealed fluid region and the outside region.

2. A non-contact mechanical seal as defined in claim 1, wherein said one or more seal gas supply passages comprise static pressure generating grooves formed on the first seal end face of the stationary seal ring, a communicating space formed between the stationary seal ring and the seal case, a case passage on a seal case side that passes through the seal case and reaches the communicating space and a stationary seal ring passage on the seal ring side running from the communicating space to the static pressure generating grooves through the stationary seal ring, wherein said seal further comprises a squeezer provided in the one or more seal gas supply passages.

3. A non-contact mechanical seal as defined in claim 2, wherein said static pressure generating grooves comprise a plurality of arc-shaped recessed grooves, having a width W, and arranged concentrically and end to end on the first seal end face, wherein each respective arc-shaped recessed groove is identical in groove width and groove depth, and wherein each arc shaped recessed groove is separated from another arc-shaped recessed groove by an inter-groove land having a length L, and wherein L is approximately equal to W.

4. A non-contact mechanical seal as defined in claim 3, wherein a pressure of the seal gas supplied to the static pressure generating grooves through the squeezer is 0.5 to 1.5 bar higher than a pressure of the sealed fluid.

5. A non-contact mechanical seal as defined in claim 2, wherein a pressure of the seal gas supplied through said one or more seal gas supply passages is 1 to 3 bar higher than a pressure of the sealed fluid.

6. A non-contact mechanical seal as defined in claim 3, wherein a pressure of the seal gas supplied through said one or more seal gas supply passages is 1 to 3 bar higher than the pressure of the sealed fluid.

7. A non-contact mechanical seal as defined in claim 4, wherein a pressure of the seal gas supplied through said one or more seal gas supply passages is 1 to 3 bar higher than the pressure of the sealed fluid.

8. A non-contact mechanical seal as defined in claim 2, wherein said one or more seal gas leading passages pass through the rotary seal ring with first open ends on one side open on the second seal end face and second open ends open into said annular space, wherein the first open ends are positioned opposite to said static pressure generating grooves, and wherein a diameter D of the first open ends is equal to or slightly smaller than a groove width W. wherein the first open ends are positioned opposite to said static pressure generating grooves, and wherein a diameter D of the first open ends is equal to or slightly smaller than the groove width W.

9. A non-contact-type mechanical seal as defined in claim 3, wherein said one or more seal gas leading passages pass through the rotary seal ring with first open ends on one side open on the second seal end face and second open ends open into said annular space, wherein the first open ends are positioned opposite to said static pressure generating grooves, and wherein a diameter D of the first open ends is equal to or slightly smaller than the groove width W.

10. A non-contact-type mechanical seal as defined in claim 4, wherein said one or more seal gas leading passages pass through the rotary seal ring with first open ends on one side open on the second seal end face and second open ends open into said annular space, wherein the first open ends are positioned opposite to said static pressure generating grooves, and wherein a diameter D of the first open ends is equal to or slightly smaller than the groove width W.

11. A non-contact mechanical seal as defined in claim 1, wherein said O rings comprise a non-compressive elastic material.

* * * * *